(12) United States Patent
Welty et al.

(10) Patent No.: US 9,864,377 B2
(45) Date of Patent: Jan. 9, 2018

(54) NAVIGATION USING PLANNED ROBOT TRAVEL PATHS

(71) Applicant: LOCUS ROBOTICS CORPORATION, Andover, MA (US)

(72) Inventors: Bruce Welty, Boston, MA (US);
Bradley Powers, Lowell, MA (US);
Eric Tappan, Boxborough, MA (US)

(73) Assignee: Locus Robotics Corporation, Wilmington, MA (US)

(*) Notice: Subject to any disclaimer, the term of this patent is extended or adjusted under 35 U.S.C. 154(b) by 84 days.

(21) Appl. No.: 15/088,474

(22) Filed: Apr. 1, 2016

(65) Prior Publication Data

US 2017/0285648 A1    Oct. 5, 2017

(51) Int. Cl.
| | |
|---|---|
| *G06K 9/00* | (2006.01) |
| *G05D 1/02* | (2006.01) |
| *B25J 5/00* | (2006.01) |
| *B25J 11/00* | (2006.01) |
| *G06Q 10/08* | (2012.01) |

(52) U.S. Cl.
CPC ........... *G05D 1/0246* (2013.01); *B25J 5/007* (2013.01); *B25J 11/008* (2013.01); *G05D 1/0236* (2013.01); *G05D 1/0248* (2013.01); *G05D 1/0274* (2013.01); *G06K 9/00664* (2013.01); *G06Q 10/087* (2013.01); *G05D 2201/0216* (2013.01); *Y10S 901/01* (2013.01)

(58) Field of Classification Search
CPC ........ G06T 7/70; G06T 11/00; G06K 9/00664
See application file for complete search history.

(56) References Cited

U.S. PATENT DOCUMENTS

| | | |
|---|---|---|
| 8,983,774 B2 | 3/2015 | Gao et al. |
| 9,463,927 B1 | 10/2016 | Theobald |
| 2006/0095160 A1* | 5/2006 | Orita ............... G05D 1/027 700/248 |

(Continued)

FOREIGN PATENT DOCUMENTS

| | | |
|---|---|---|
| EP | 2410395 | 1/2012 |
| WO | 2015017691 A1 | 2/2015 |

OTHER PUBLICATIONS

International Search Report and Written Opinion, dated Jun. 28, 2017, received in international patent application No. PCT/US2017/025650, 10 pgs.

*Primary Examiner* — Eueng-Nan Yeh
(74) *Attorney, Agent, or Firm* — Verrill Dana, LLP; John W. Powell

(57) ABSTRACT

A method for generating a navigation map of an environment in which a plurality of robots will navigate, includes obtaining an image of the environment defined by a plurality of pixels, each having a cost value. The environment includes an image of a fixed object having a set of pixels corresponding to its location and having a first defined cost value. The method includes obtaining a planned path image for the robots, which include a first set of pixels corresponding to the location of each robot in the environment and a second set of pixels adjacent to the first set of pixels and extending along a planned path of travel toward a destination. The first set of pixels of each robot having the first defined cost value and the second set of pixels having a second defined cost value. The second defined cost value is less than the first defined cost value.

26 Claims, 12 Drawing Sheets

(56) References Cited

U.S. PATENT DOCUMENTS

| | | |
|---|---|---|
| 2007/0061043 A1 | 3/2007 | Ermakov et al. |
| 2007/0156286 A1 | 7/2007 | Yamauchi |
| 2008/0059015 A1* | 3/2008 | Whittaker ............ G05D 1/0274 701/23 |
| 2009/0043504 A1 | 2/2009 | Bandyopadhyay et al. |
| 2010/0296908 A1 | 11/2010 | Ko |
| 2011/0082585 A1 | 4/2011 | Sofman et al. |
| 2011/0200420 A1 | 8/2011 | Driskill |
| 2012/0195491 A1* | 8/2012 | Zhang .................. G05D 1/0227 382/153 |
| 2012/0330458 A1 | 12/2012 | Weiss |
| 2013/0317642 A1 | 11/2013 | Asaria et al. |
| 2001/4005933 | 1/2014 | Fong et al. |

* cited by examiner

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

FIG. 7

US 9,864,377 B2

NAVIGATION USING PLANNED ROBOT TRAVEL PATHS

FIELD OF INVENTION

This invention relates to robot navigation and more particularly to dynamically updating planned robot travel paths and superimposing cost images of the planned travel paths on maps used for robot navigation.

BACKGROUND

Ordering products over the internet for home delivery is an extremely popular way of shopping. Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

The order-fulfillment process typically takes place in a large warehouse that contains many products, including those listed in the order. Among the tasks of order fulfillment is therefore that of traversing the warehouse to find and collect the various items listed in an order. In addition, the products that will ultimately be shipped first need to be received in the warehouse and stored or "placed" in storage bins in an orderly fashion throughout the warehouse so they can be readily retrieved for shipping.

In a large warehouse, the goods that are being delivered and ordered can be stored in the warehouse very far apart from each other and dispersed among a great number of other goods. With an order-fulfillment process using only human operators to pick and place the goods requires the operators to do a great deal of walking and can be inefficient and time consuming. Since the efficiency of the fulfillment process is a function of the number of items shipped per unit time, increased time reduces pick place efficiency.

In order to increase efficiency, robots may be used to perform functions of humans or they may be used to supplement human activities. For example, robots may be assigned to "place" a number of items in various locations dispersed throughout the warehouse or to "pick" items from various locations for packing and shipping. The picking and placing may be done by the robot alone or with the assistance of human operators. For example, in the case of a pick operation, the human operator would pick items from shelves and place them on the robots or, in the case of a place operation, the human operator would pick items from the robot and place them on the shelves.

In a busy operation, many robots may need to navigate the warehouse space rapidly while avoiding fixed obstacles, such as shelves and walls, as well as dynamic obstacles, such as human operators and other robots. To do this, robots may utilize on board laser-radar and a mapping technique called simultaneous localization and mapping (SLAM), which is a computational problem of constructing and updating a map of an environment. As the robot begins to traverse the environment, e.g. a warehouse, it uses its laser radar to determine if there are any obstacles in its path, either fixed or dynamic, and iteratively updates its path to its destination to avoid observed objects. The robot may assess and potentially re-plan its route many times per second, e.g. about once every 50 milliseconds.

This is a complex and computationally challenging process for robots and can result in numerous path changes and inefficiencies in the paths selected by robots to get to their destinations.

SUMMARY

In one aspect, the invention features a method for generating a navigation map of an environment in which a plurality of robots will navigate. The method includes obtaining an image of the environment, the image defined by a plurality of pixels, and each pixel having a cost value associated with it. The image of the environment includes an image of at least one fixed object comprising a set of pixels corresponding to the location of the at least one fixed object in the environment. The set of pixels corresponding to the location of the at least one fixed object having a first defined cost value. The method includes obtaining a planned path image of the plurality of robots in the environment, the planned path image including for each robot a first set of pixels corresponding to the location of each robot in the environment and a second set of pixels adjacent to the first set of pixels and extending along a planned path of travel of each robot toward a destination. The pixels in the first set of pixels of each robot have the first defined cost value and the second set of pixels of each robot comprise pixels having a second defined cost value. The second defined cost value is less than the first defined cost value.

In other aspects of the invention one or more of the following features may be included. The image of the environment including the image of at least one fixed object may be stored locally with each of the plurality of robots. Each of the plurality of robots may produce its own planned path and communicates its own planned path to the other of the plurality of robots. Each robot may combine the image of the environment including the image of at least one fixed object with images representing the planned paths received from other of the plurality of robots to form a navigation map. Each robot may use the navigation map to plan a path from its current location to its destination. Each of the plurality of robots may produce its own updated planned path at regular time intervals as each robot traverses its path to its destination and communicates its own updated planned path to the other of the plurality of robots at such regular intervals; and wherein each robot may use the updated planned path of the other of the plurality of robots to produce an updated navigation map and updates its planned path to its destination using the updated navigation map.

In yet other aspects of the invention one or more of the following features may be included. The second set of pixels of each robot may comprise pixels having plurality of cost values less than the first cost value, and wherein the cost values of the pixels may decrease proportionally in value as they extend from adjacent to the first set of pixels out along the planned path of travel of each robot toward a destination. The second set of pixels of each robot may be formed by producing a plurality of regions along the planned path of travel of each robot toward a destination and wherein each region may successively comprise pixels having pixel values less than the preceding region. The regions may be circular in shape and the regions may have a radius corresponding to the size of the robots. The environment may be a warehouse.

In another aspect, the invention features a method for navigating a robot in an environment from a current location to a destination. The environment includes at least one fixed object and at least one other robot. The method comprises obtaining an image of the environment, the image defined by a plurality of pixels, each pixel having a cost value associated with it. The image of the environment includes an image of the at least one fixed object comprising a set of pixels corresponding to the location of the at least one fixed object in the environment. The set of pixels corresponding to the location of the at least one fixed object having a first defined cost value. The method includes obtaining an image of the at least one other robot in the environment, the image of the at least one other robot including a first set of pixels corresponding to the location of the at least one other robot in the environment. There is a second set of pixels adjacent to the first set of pixels and extending along a planned path of travel of the at least one other robot toward a destination. The pixels in the first set of pixels of the at least one other robot have the first defined cost value and the second set of pixels of the at least one other robot comprise pixels having a second defined cost value. The second defined cost value is less than the first defined cost value. The method also includes planning a path from the current location of the robot to the destination of the robot based on the image of the at least one fixed object and the image of the at least one other robot.

In further aspects of the invention one or more of the following features may be included. The image of the environment including the image of at least one fixed object may be stored locally within the robot. The at least one other robot may produce its own planned path from a current location to a destination and communicates its own planned path to the robot. The robot may combine the image of the environment including the image of at least one fixed object with an image of the planned path received from the at least one other robot to form a navigation map. The robot may use the navigation map to plan a path from its current location to its destination.

In yet further aspects of the invention one or more of the following features may be included. The at least one other robot may produce its own updated planned path at regular time intervals as it traverses its path to its destination and communicates its own updated planned path to the robot at such regular intervals. The robot may use the updated planned path of the at least one other robot to produce an updated navigation map and updates its planned path to its destination using the updated navigation map. The second set of pixels of the at least one other robot may comprise pixels having plurality of cost values less than the first cost value, and wherein the cost values of the pixels may decrease proportionally in value as they extend from adjacent to the first set of pixels out along the planned path of travel of the at least one other robot toward its destination. The second set of pixels of the at least one other robot may be formed by producing a plurality of regions along the planned path of travel of the at least one other robot toward its destination and wherein each region may successively comprise pixels having pixel values less than the preceding region. The regions may be circular in shape and the regions may have a radius corresponding to the size of the robots. The environment may be a warehouse.

In another aspect, the invention features a robot configured to navigate an environment including at least one fixed object and a plurality of other robots. The robot comprises a mobile base for propelling the robot throughout the environment and a communication device enabling communication between the robot and the plurality of other robots. There is also a processor, in communication with the communication device. The processor is configured to obtain an image of the environment. The image is defined by a plurality of pixels, each pixel having a cost value associated with it. The image of the environment includes an image of the at least one fixed object comprising a set of pixels corresponding to the location of the at least one fixed object in the environment. The set of pixels corresponding to the location of the at least one fixed object has a first defined cost value. The processor is configured to obtain an image of the plurality of other robots in the environment, the image including for each robot a first set of pixels corresponding to the location of each robot in the environment. There is a second set of pixels adjacent to the first set of pixels and extending along a planned path of travel of each other robot toward a destination. The pixels in the first set of pixels of each other robot having the first defined cost value and the second set of pixels of each other robot comprising pixels having a second defined cost value. The second defined cost value is less than the first defined cost value. The processor is also configured to plan a path from the current location of the robot to the destination of the robot based on the image of the at least one fixed object and the images of the plurality of other robots.

In other aspects of the invention one or more of the following features may also be included. The image of the environment including the image of at least one fixed object may be stored locally with each of the plurality of robots. Each of the plurality of other robots may be configured to produce its own planned path and communicate its own planned path using its communications device to the other of the plurality of robots. The processor may be configured to combine the image of the environment including the image of at least one fixed object with images of the planned paths received from the other of the plurality of robots to form a navigation map. The processor may be configured to use the navigation map to plan a path from its current location to its destination. The processor may be configured to receive from each of the plurality of other robots an updated planned path at regular time intervals as each other robot traverses its path to its destination. The processor may be configured to use the updated planned path of the other of the plurality of robots to produce an updated navigation map and may update its planned path to its destination using the updated navigation map.

In further aspects of the invention one or more of the following features may also be included. The second set of pixels of each of the plurality of other robots may comprise pixels having a plurality of cost values less than the first cost value. The cost values of the pixels may decrease proportionally in value as they extend from adjacent to the first set of pixels out along the planned path of travel of each robot toward a destination. The second set of pixels of each of the plurality of other robots may be formed by producing a plurality of regions along the planned path of travel of each robot toward a destination and each region may successively comprise pixels having pixel values less than the preceding region. The regions may be circular in shape and the regions may have a radius corresponding to the size of the robots. The environment may be a warehouse.

These and other features of the invention will be apparent from the following detailed description and the accompanying figures, in which:

BRIEF DESCRIPTION OF THE FIGURES

FIG. 6 is a table of the fiducial identification to pose mapping;

FIG. 7 is a table of the bin location to fiducial identification mapping;

DETAILED DESCRIPTION

Figure 1:
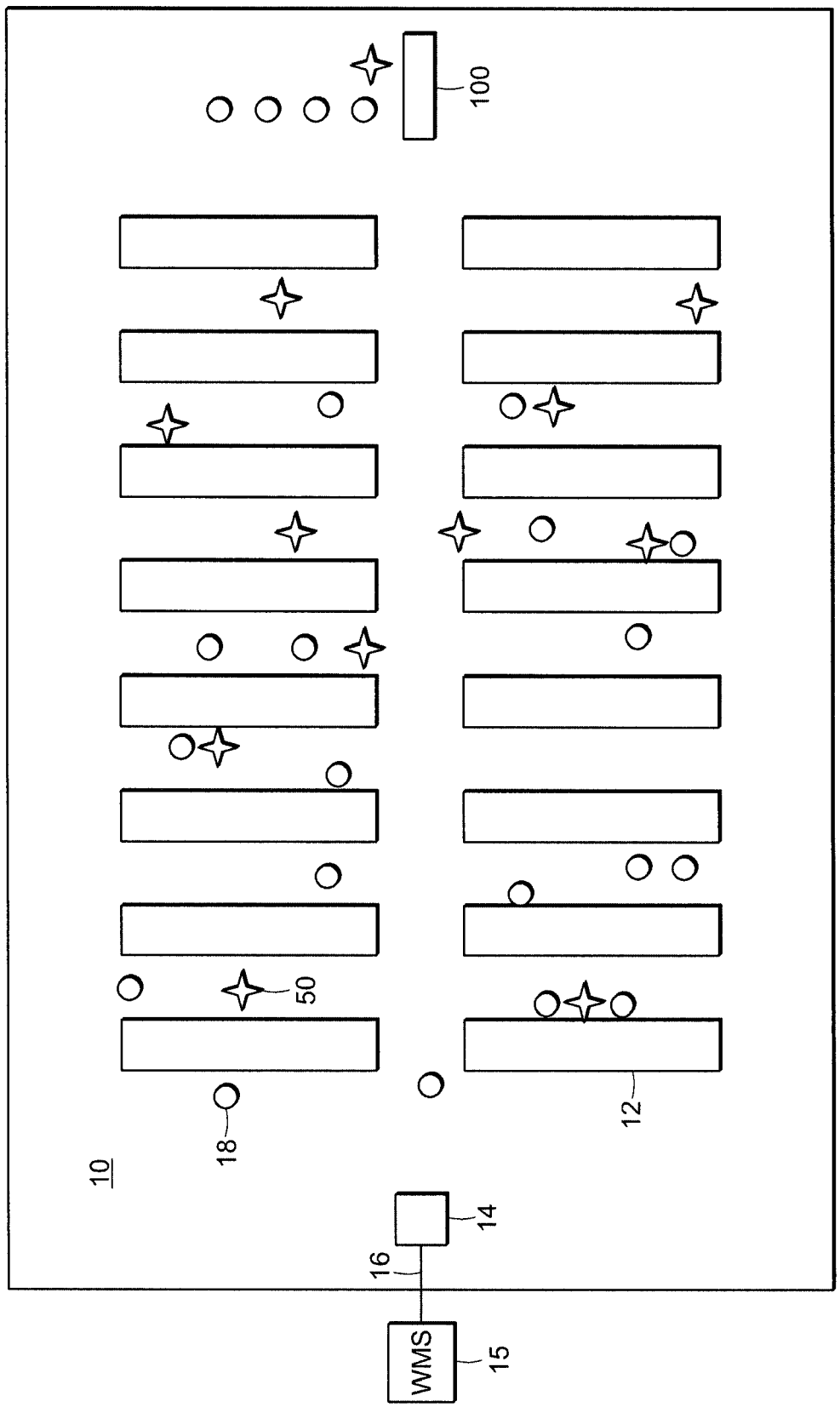
FIG. 1 is a top plan view of an order-fulfillment warehouse.

Referring to FIG. 1, a typical order-fulfillment warehouse 10 includes shelves 12 filled with the various items that could be included in an order 16. In operation, the order 16 from warehouse management server 15 arrives at an order-server 14. The order-server 14 communicates the order 16 to a robot 18 selected from a plurality of robots that roam the warehouse 10.

Figure 2:
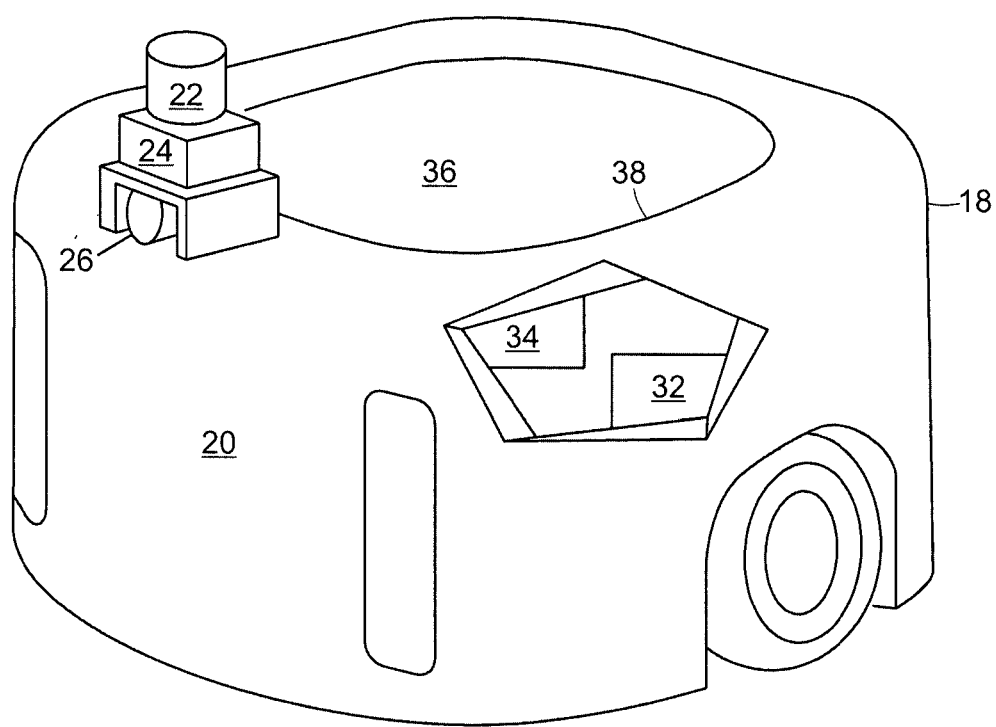
FIG. 2 is a perspective view of a base of one of the robots used in the warehouse shown in FIG. 1.
Figure 3:
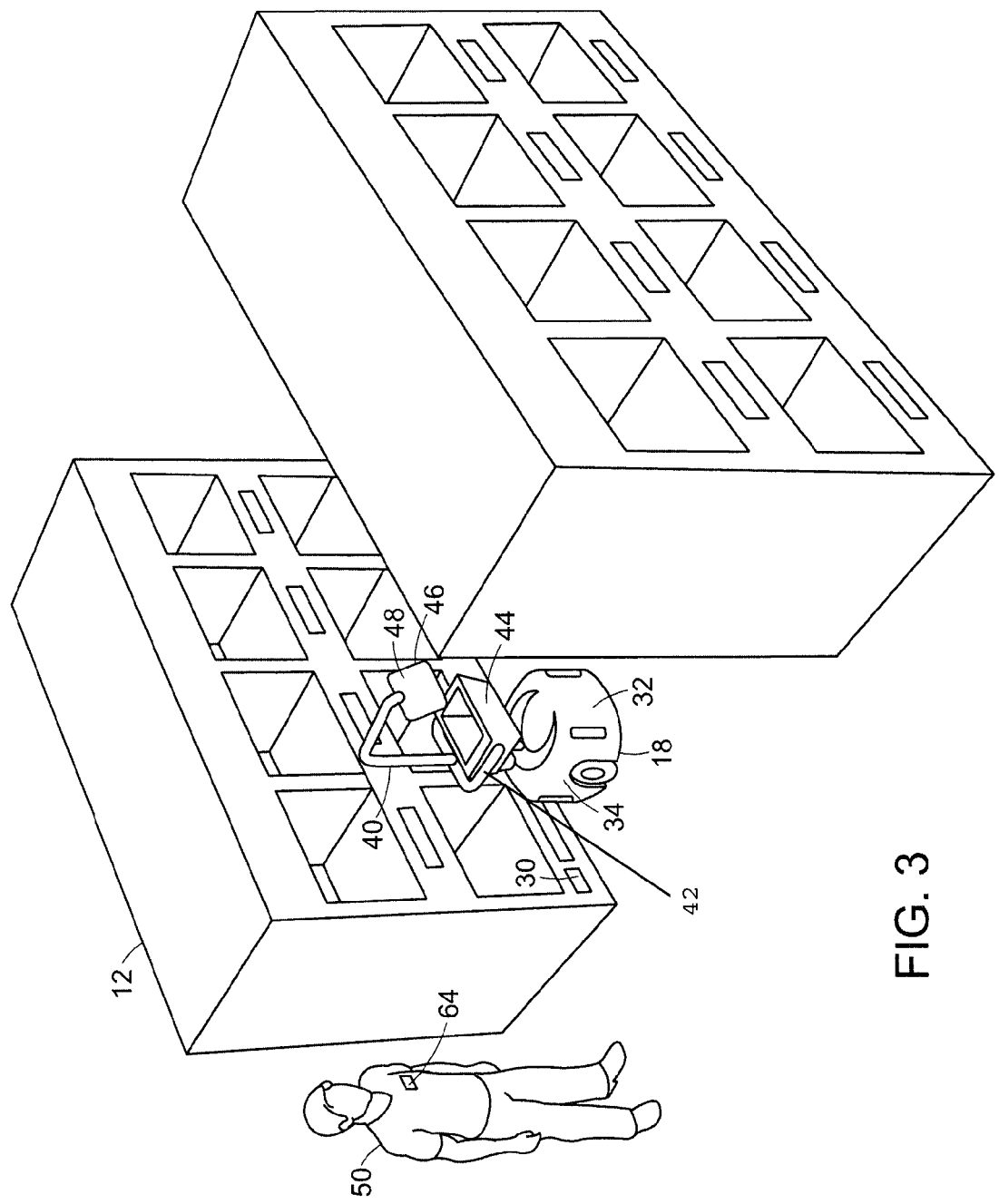
FIG. 3 is a perspective view of the robot in FIG. 2 outfitted with an armature and parked in front of a shelf shown in FIG. 1.

In a preferred embodiment, robot 18, shown in FIG. 2, includes an autonomous wheeled base 20 having a laser-radar 22. The base 20 also features a transceiver 24 that enables the robot 18 to receive instructions from the order-server 14, and a camera 26. The base 20 also features a processor 32 that receives data from the laser-radar 22 and the camera 26 to capture information representative of the robot's environment and a memory 34 that cooperate to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-11.

While the initial description provided herein is focused on picking items from bin locations in the warehouse to fulfill an order for shipment to a customer, the system is equally applicable to the storage or placing of items received into the warehouse in bin locations throughout the warehouse for later retrieval and shipment to a customer. The invention is also applicable to inventory control tasks associated with such a warehouse system, such as, consolidation, counting, verification, inspection and clean-up of products.

Referring again to FIG. 2, an upper surface 36 of the base 20 features a coupling 38 that engages any one of a plurality of interchangeable armatures 40, one of which is shown in FIG. 3. The particular armature 40 in FIG. 3 features a tote-holder 42 for carrying a tote 44 that receives items, and a tablet holder 46 for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although a robot 18 excels at moving around the warehouse 10, with current robot technology, it is not very good at quickly and efficiently picking items from a shelf and placing them on the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48, which the local operator 50 can read, or by transmitting the order to a handheld device used by the local operator 50.

Upon receiving an order 16 from the order server 14, the robot 18 proceeds to a first warehouse location, e.g. shown in FIG. 3. It does so based on navigation software stored in the memory 34 and carried out by the processor 32. The navigation software relies on data concerning the environment, as collected by the laser-radar 22, an internal table in memory 34 that identifies the fiducial identification ("ID") of fiducial marker 30 that corresponds to a location in the warehouse 10 where a particular item can be found, and the camera 26 to navigate.

Upon reaching the correct location, the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a packing station 100, FIG. 1, where they are packed and shipped.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The navigation approach of this invention, as well as the semantic mapping of a SKU of an item to be retrieved to a fiducial ID/pose associated with a fiducial marker in the warehouse where the item is located, is described in detail below with respect to FIGS. 4-11.

Using one or more robots 18, a map of the warehouse 10 must be created and dynamically updated to determine the location of objects, both static and dynamic, as well as the locations of various fiducial markers dispersed throughout the warehouse. To do this, robots 18 initially navigate the warehouse and build/update a map 10a, FIG. 4, utilizing its laser-radar 22 and simultaneous localization and mapping (SLAM), which is a computational problem of constructing or updating a map of an unknown environment. Popular SLAM approximate solution methods include the particle filter and extended Kalman filter. The SLAM GMapping approach is the preferred approach, but any suitable SLAM approach can be used.

Robot 18 utilizes its laser-radar 22 to create/update map 10a of warehouse 10 as it travels throughout the space identifying, open space 112, walls 114, objects 116, and other static obstacles, such as shelf 12, in the space, based on the reflections it receives as the laser-radar scans the environment.

Figure 4:
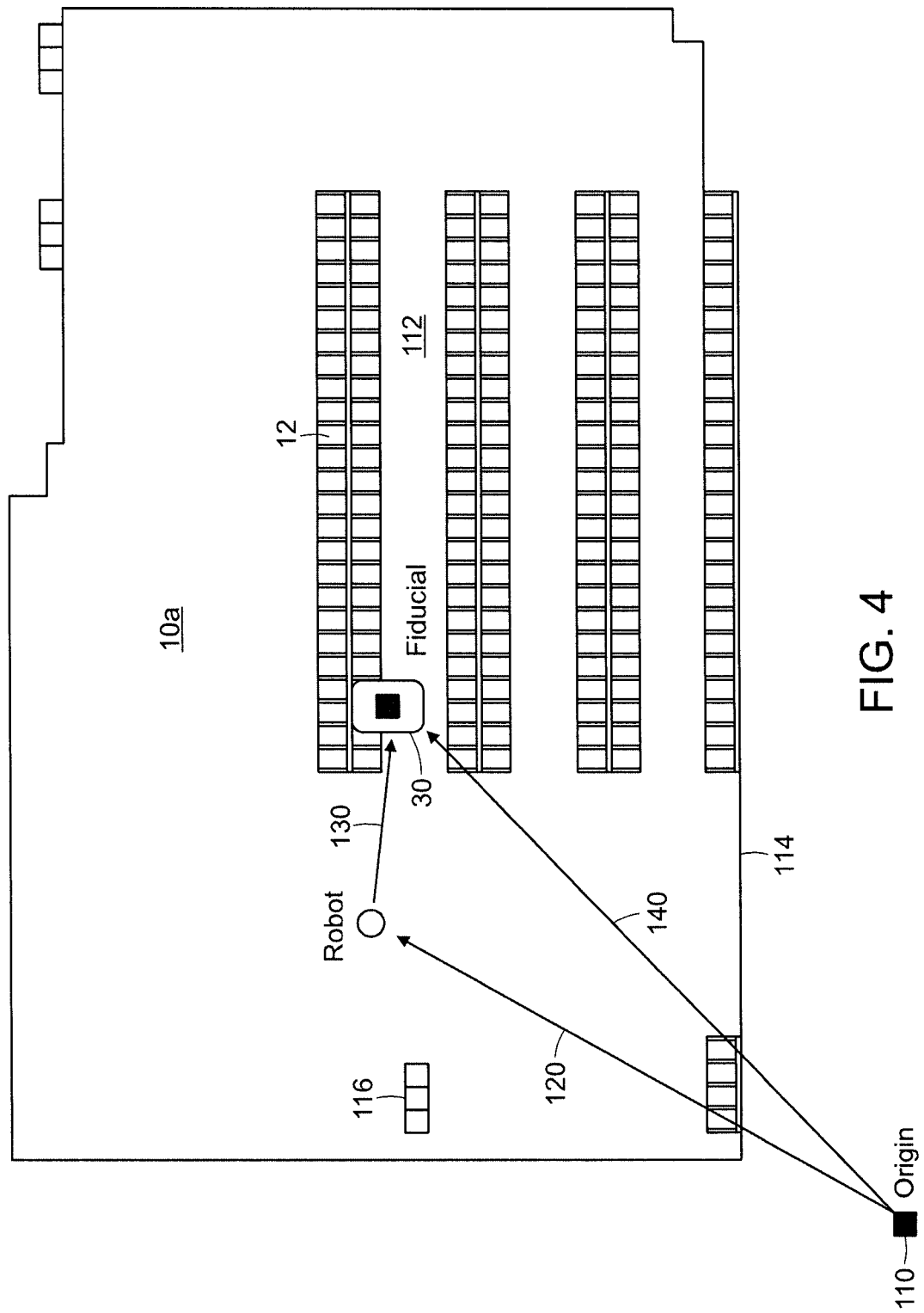
FIG. 4 is a partial map of the warehouse of FIG. 1 created using laser radar on the robot.

While constructing/updating the map 10a, robots 18 navigate through warehouse 10 using camera 26 to scan the environment to locate fiducial markers (two-dimensional bar codes) dispersed throughout the warehouse on shelves proximate bins, such as 32 and 34, FIG. 3, in which items are stored. Robots 18 use a known starting point or origin for reference, such as origin 110. When a fiducial marker, such as fiducial marker 30, FIGS. 3 and 4, is located by robot 18 using its camera 26, the location in the warehouse relative to origin 110 is determined.

By the use of wheel encoders and heading sensors, vector 120, and the robot's position in the warehouse 10 can be determined. Using the captured image of a fiducial marker/two-dimensional barcode and its known size, robot 18, using known techniques, can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, ω) for fiducial marker 30 can be determined.

Figure 5:
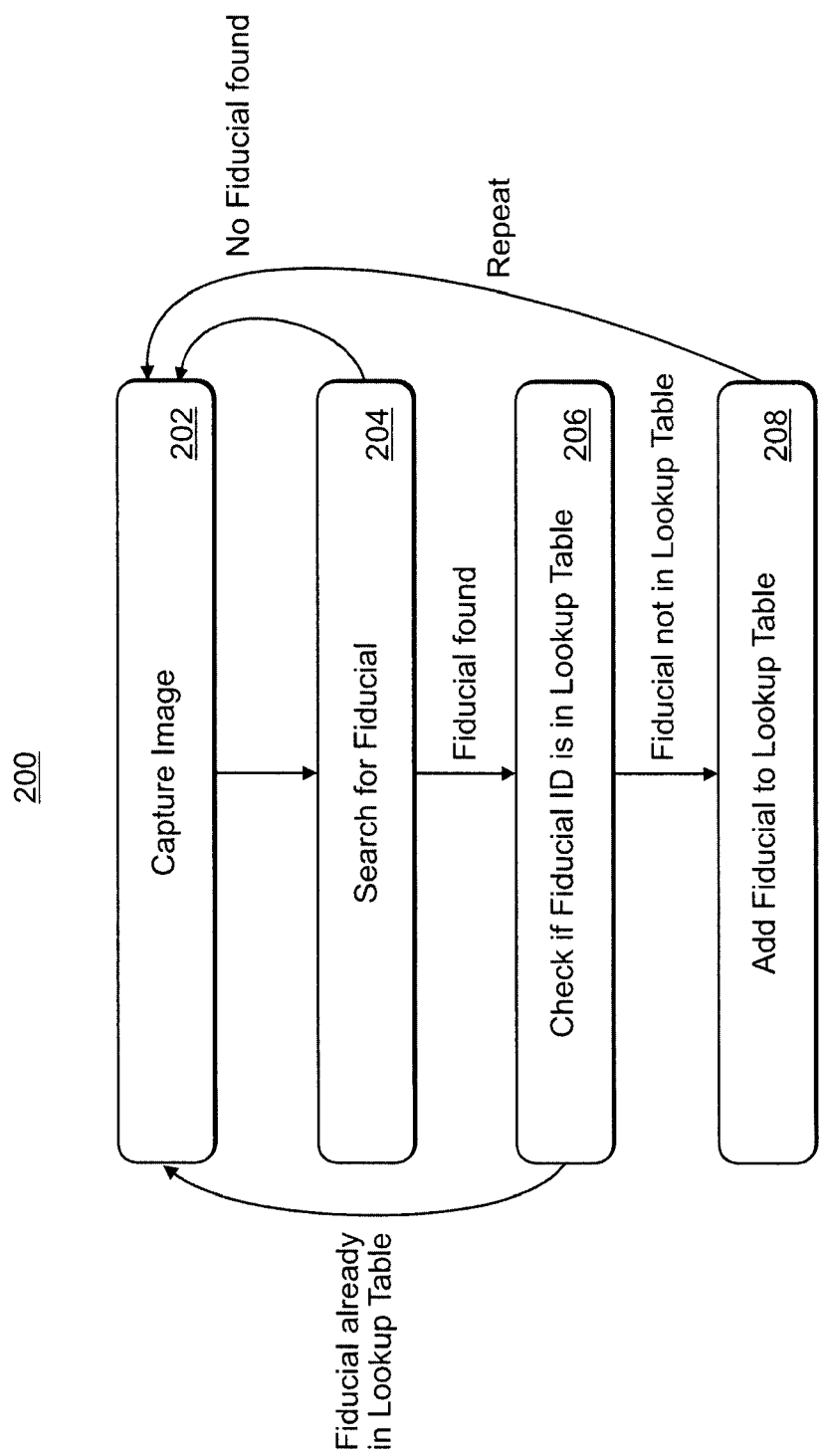
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using camera 26 captures an image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc, and a pose for the fiducial marker/bar code associated with each fiducial identification. The pose consists of the x,y,z coordinates in the warehouse along with the orientation or the quaternion (x,y,z, ω).

In another look-up Table 400, FIG. 7, which may also be stored in the memory of each robot, is a listing of bin locations (e.g. 402a-f) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, Robot 18 can determine the pose of the fiducial ID using the information in table 300, FIG. 6, and then navigate to the pose as described herein.

Figure 8:
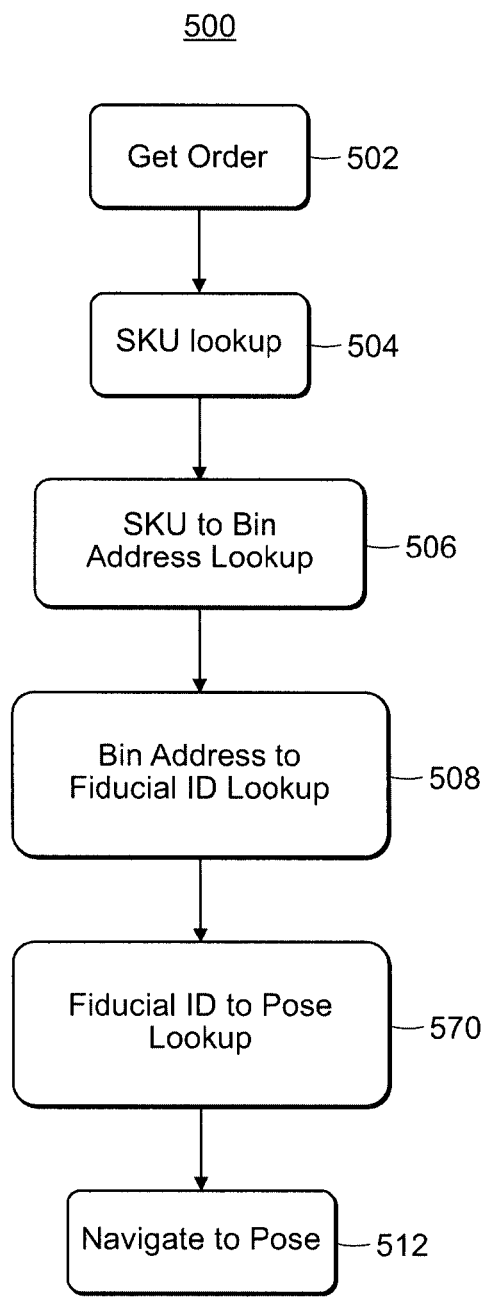
FIG. 8 is a flow chart depicting product SKU to pose mapping process.

The order fulfillment process according to this invention is depicted in flow chart 500, FIG. 8. In step 502, warehouse management system 15, FIG. 1, obtains an order, which may consist of one or more items to be retrieved. In step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 26, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

Given the dynamic environment in a busy warehouse operation, many robots need to navigate the warehouse space rapidly while avoiding fixed obstacle, such as shelves and walls, as well as dynamic obstacles, such as human operators and other robots. This can be a complex and computationally challenging process for the robots and can result in numerous path changes and inefficiencies in the paths selected by the robots to get to their destinations.

As the robots travel through the warehouse they may use a dynamically updated map to navigate. The map used by the robots to plan their paths may be two-dimensional and comprise a plurality of pixels with the individual pixels being assigned a color indicating the presence or absence of an object in the particular area. The color black may be used to indicate the presence of a solid object, while white indicates no solid object or open space. The colors of the pixels are also correlated to numerical values that are used by the robots to assess risk. Black pixels, i.e. those indicating a solid object, are assigned the highest numerical value indicating the highest risk or "cost". White pixels, i.e. those indicating open space, are assigned the lowest numerical value indicating the lowest risk or cost. Pixels of various shades of gray may also be used and are assigned numerical values ranging from lowest (shades closest to white) to highest (shades closest to black) to indicate the "cost" or risk associated with each pixel. Pixels having numerical values ranging from 0 to 255, for example, may be used to indicate the lowest to highest cost values.

As the robots assess potential paths that they can take from one point to another they can determine the best possible path to take based not only on the path distance, but also on the cost or risk associated with each path. In other words, the numerical cost values of the individual pixels along each path can be summed and the summation will provide an overall cost or risk associated with the path. Then, an optimized path can be selected based on the length and cost of each path. Optimized path selection processes, based on path distance and path cost, are well known and any standard process may be used, including the A* path finding process.

In using such an optimization process, it is known to include in the maps used by the robots, static information, such as fixed objects like shelving and walls, and "no go" areas, like pre-defined off limits areas for the robots, as well as dynamic information like the location of robots and human operators. However, in order to enhance and make more efficient robot navigation within the warehouse space, the current approach includes building maps with real time information not only about the various robots' current locations but also about their planned travel paths. This allows each robot to more proactively plan its route from its current location to its destination, factoring in the potential of other robots crossing its path while such robots are on their way to their own destinations.

Figure 9:
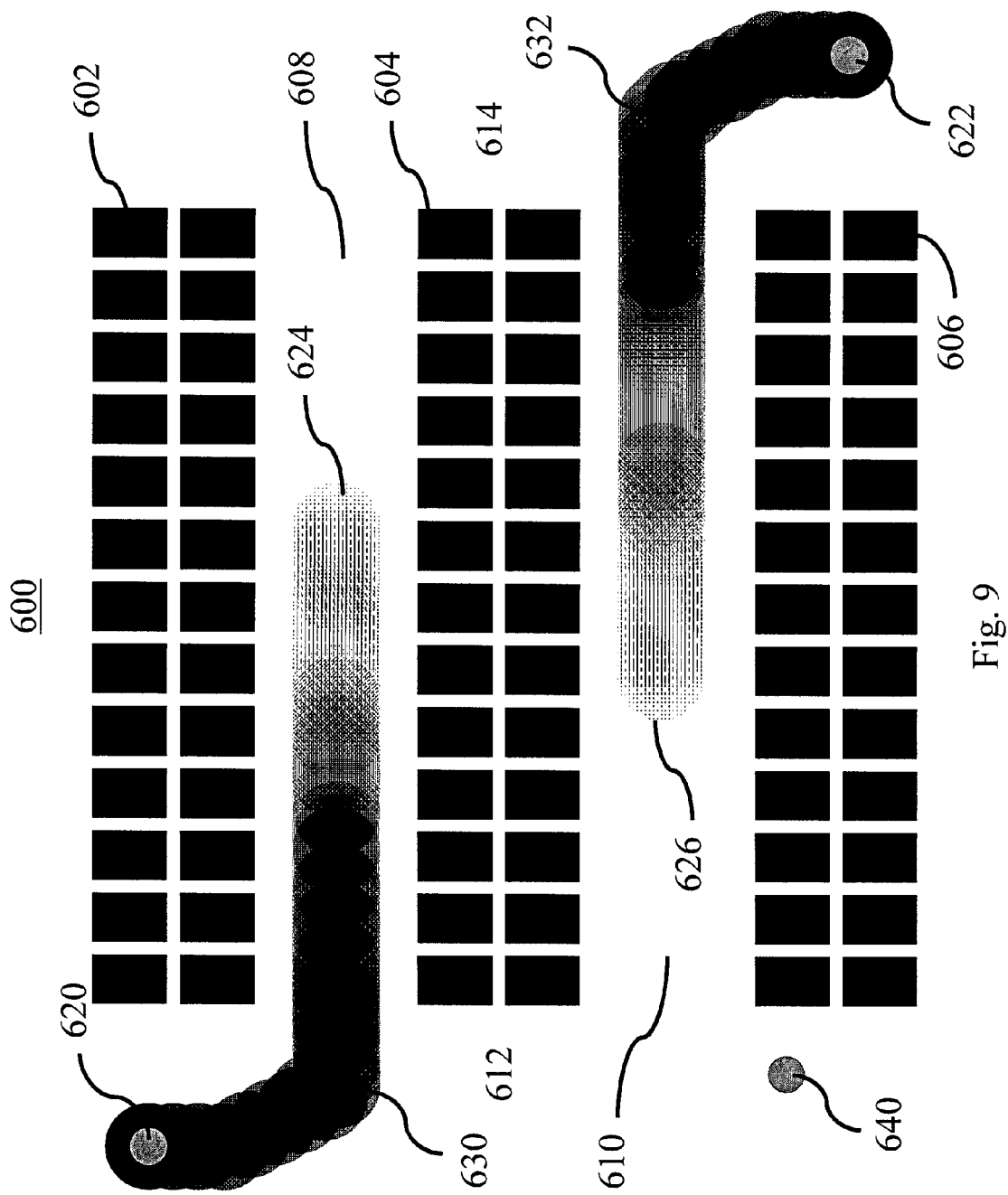
FIG. 9 is navigation map with superimposed cost images of planned robot travel paths according to this invention.

An example of such as map is shown in FIG. 9 as map 600. Included on map 600 are shelving units 602, 604, and 606, which are colored black to indicate the highest cost or risk as they are solid fixed objects and need to be avoided by the robots. In between the shelves are rows 608 and 610, which are white in color, indicating a low cost or risk and areas in which the robots may travel with relatively low risk assuming no other objects are present. Proximate the end caps of the shelving units are areas 612 and 614 which are also white in color indicating relatively low risk of travel assuming no other objects are present.

In addition, robots 620 and 622 are shown on the map 600 in their current locations in areas 612 and 614, respectively. The ultimate destinations for robots 620 and 622 are locations 624 and 626, respectively. Along the planned travel path of robot 620 is shown a superimposed cost image 630 which spans from its current location to its destination 624 in row 608. Along the projected travel path of robot 622 is shown a superimposed cost image 632 which spans from its current location to its destination 626 in row 610.

Superimposed cost images 630 and 632 include darker/higher cost value pixels closer to the then current location of robots 620 and 622 and gradually lighter colors and lower cost values along the projected paths toward their destinations. The width of the superimposed cost images are correlated to the width of the robot to account for its size plus a buffer to ensure adequate clearance. For the size robots envisioned for the current application, a "buffer" having a one meter radius is superimposed on the robot. This width is used along the projected path, thus the width of the superimposed cost image is approximately two meters.

Also shown on map 600 is another robot 640. There is not included a superimposed cost image for its planned path, since this map is the map to be used for robot 640 to plan its travel. Thus, each robot's map used to plan its travel includes the superimposed cost images of all other robots, but not its own planned travel path. When robot 640 plans its travel path using, for example, A* path finding process, the superimposed cost images 630 and 632 of robots 620 and 622, respectively, are considered by robot 640. Thus, for any potential path for robot 640 which might intersect superimposed cost images 630 or 632, the numerical values of the intersecting pixels of such superimposed cost images will be factored into the path optimization algorithm. If the proposed path will intersect the superimposed cost images close to the location of the robot the numerical cost values encountered will be higher, indicating a higher risk of collision. If the proposed path will intersect the superimposed cost images further from the location of the robot the numerical cost values will be lower, indicating a lower risk of collision.

Figure 10:
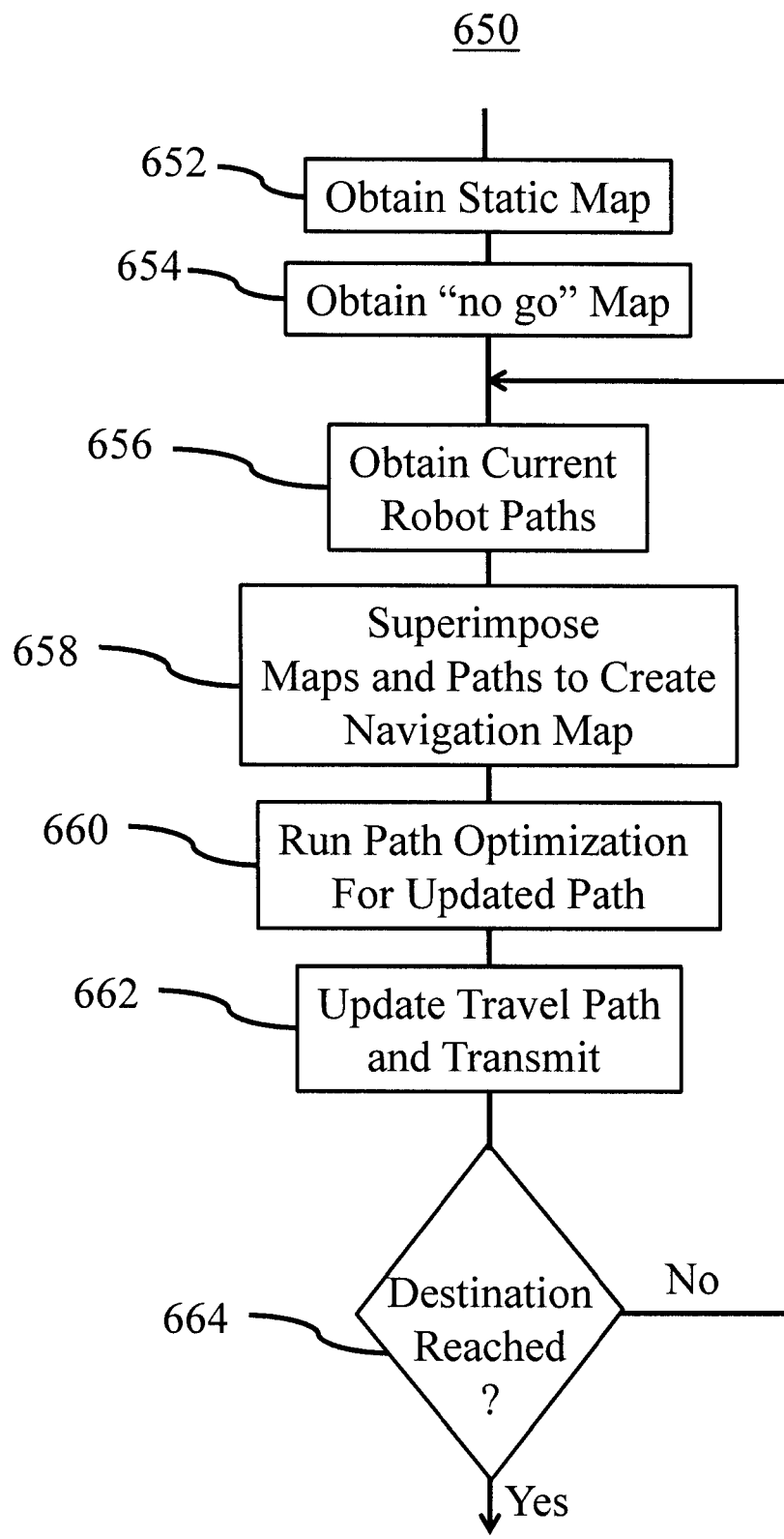
FIG. 10 is a flow chart depicting the process for producing the navigation map of FIG. 9.

The process for navigation map building is depicted in flow chart 650, FIG. 10. The maps may be built locally by each robot or centrally by a warehouse management system and provided to the robots. In this description, it is assumed that the maps are built locally by each of the robots. At step 652 a static map of the warehouse is obtained and at step 654 a "no go" map for the warehouse is obtained. These maps would have been previously created and stored locally on each robot. At step 656 the current travel paths for all other robots are obtained. The paths are generated by each robot and transmitted to the other robots by wifi.

At step 658 a consolidated navigation map is created by superimposing the static map, the no go map and the current robot paths received. At step 660, the path optimization algorithm is run using the current navigation map to update the robot's path. At step 662 each robot updates its travel path and transmits it to the other robots. At step 664, if the destination of the robot has not been reached the process cycles back to step 656 for the next iteration. If the destination has been reached, the robot determines its next destination.

The robots will typically reassess their travel paths and generating updated paths a number of times per second, e.g. at that rate of 5-10 times per second or more. Thus, each robot path is updated and transmitted to the other robots at that rate.

Figures 11A, 11B:
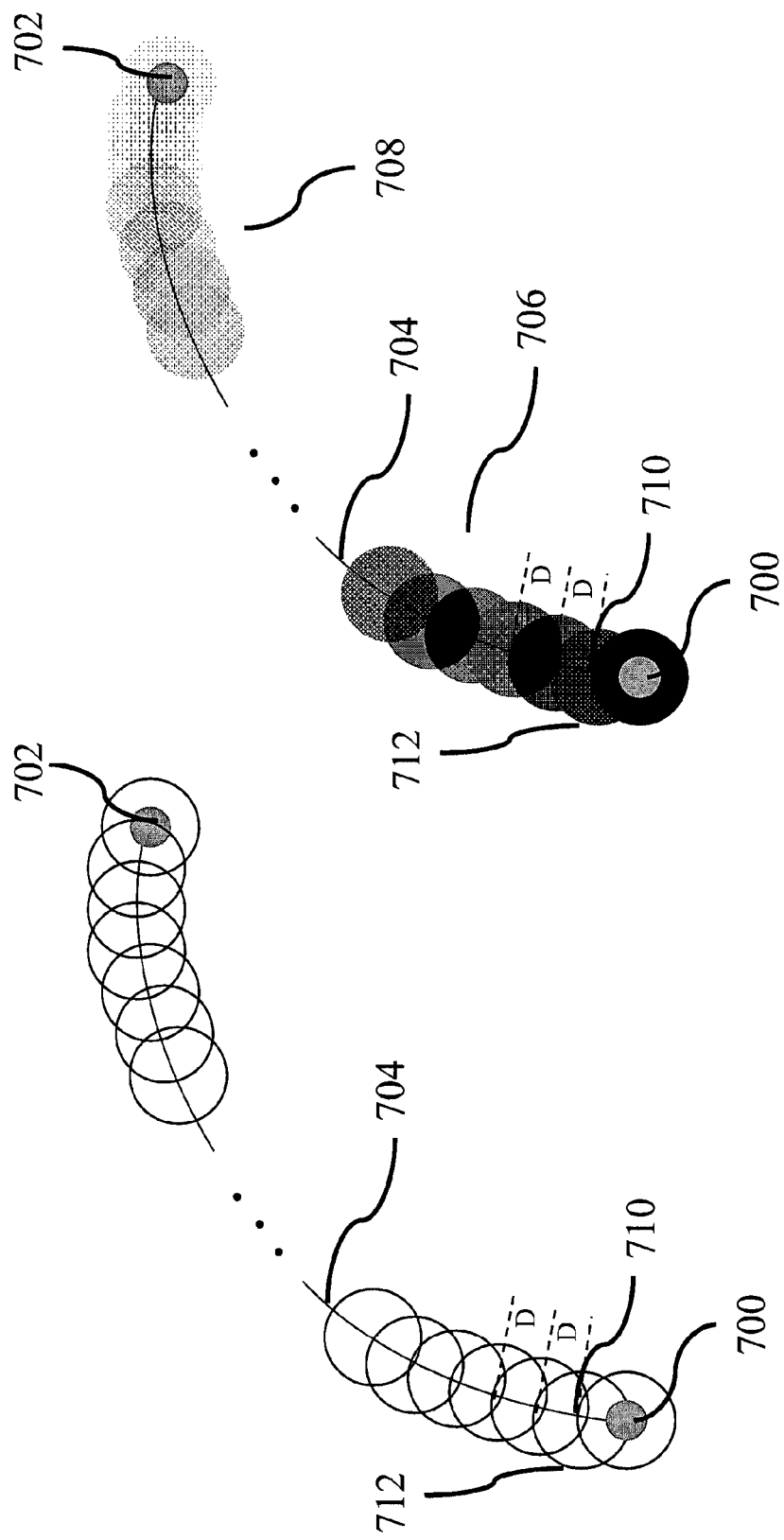
FIGS. 11a and b depict a manner of constructing superimposed cost images of planned robot travel paths as shown in FIG. 9.
Figure 12:
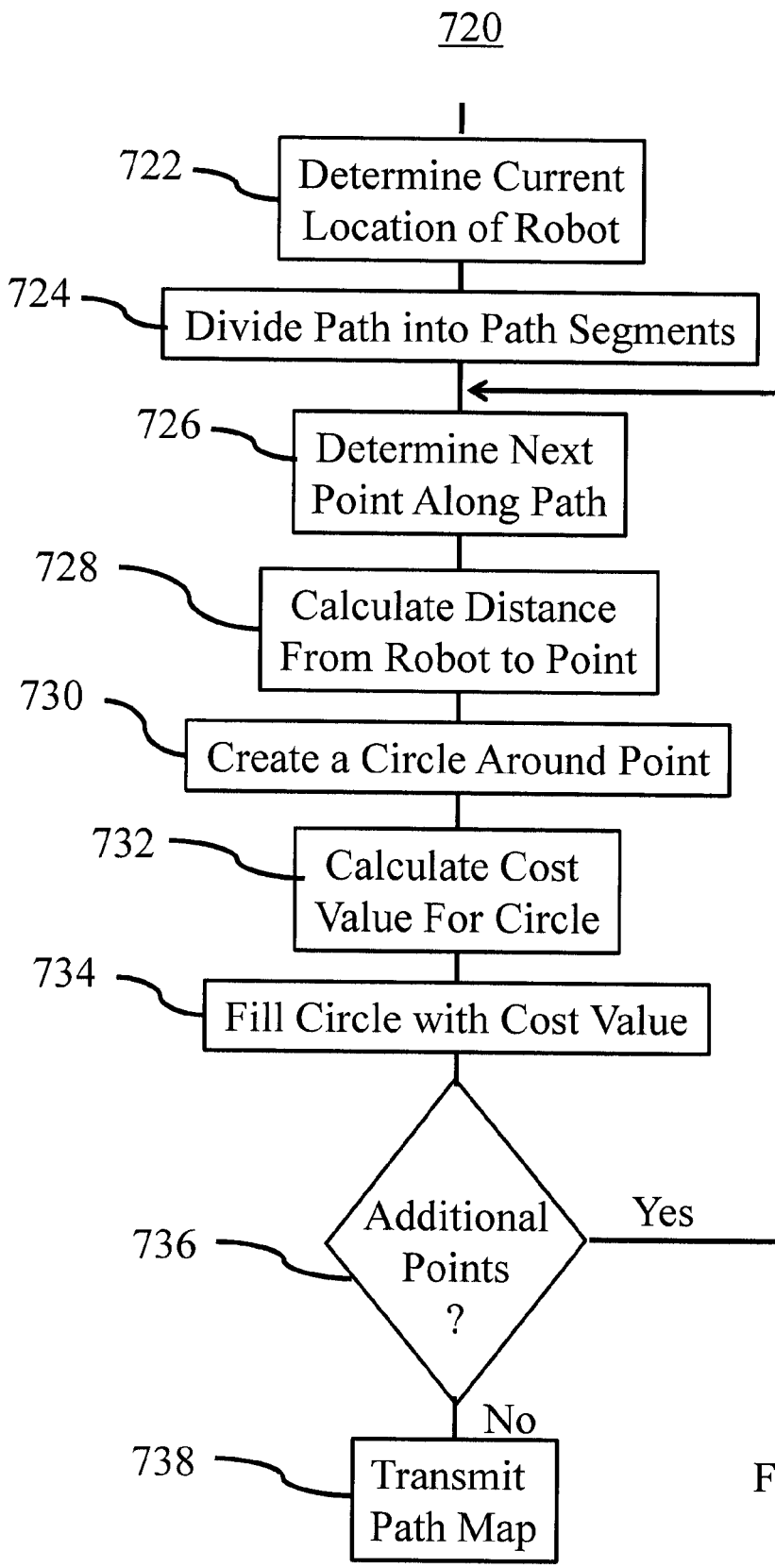
FIG. 12 is a flow chart depicting the process for producing the superimposed cost images of planned robot paths according to this invention.

The process for building the individual robot travel paths with superimposed cost images is depicted in FIGS. 11-12. In FIG. 11a, there is shown a robot 700 destined for location 702 along path 704. Path 704 is first divided into a plurality of increments or points each a distance "D" along path 704. The distance "D" used is approximately five (5) cm, but this may be varied depending on the application and the rate of data capture. At each increment/point along the path, there is disposed a circle centered on the point and with a radius of about one (1) meter. This is to provide a sufficient buffer around the robot given its expected robot size, as discussed above. Given the size of the circles and the 5 cm increments for locating the center of each circle there is a significant amount of overlap of the circles.

As shown in FIG. 11b, the circles are then filled with a cost value (color) based on the distance the center of the circle is from the current location of the robot. As can be seen proximate robot 700, in region 706, the circles are filled with a high cost value and are therefore colored black, while in region 708, which is proximate the destination at location 702, the circles are filled with lower cost values and are therefore colored light grey or white.

Flow chart 720, FIG. 12, depicts the process for creating the superimposed cost images for each robot. At step 722 the current location of the robot is determined and at step 724, the planned path along which the robot will travel from its current location to its destination is segmented into a plurality of points. At step 726 the next point along the path is determined. For example, in FIG. 11, the starting point would be point 710. At step 728 the distance from the robot to the point would be determined. For point 710 that distance would be the distance "D". At step 730 a circle having a radius of approximately 1 m would be created (see circle 712) and at step 732 the cost value to be applied to the pixels in the circle is calculated.

The cost value may calculated as follows:

$$\text{Cost} \propto 1/e^{distance\_to\_pt}$$

This method of calculation provides a cost value which is proportional to the distance along the path from the robots current location (i.e., "distance_to_pt"). At step 734 the pixels contained within the circle are filled with the numerical value corresponding to the cost value calculated at step 732 based on the range of pixel values available (in this example 0-255). At step 736 it is determined if there are additional points along the path remaining and if there are the process returns to step 726. If there are not, the superimposed cost image for the planned travel path is complete and at step 738 the new path map is transmitted (pursuant to step 662, FIG. 10) to the other robots.

Alternatively, in order to reduce the amount of data transmitted via wifi, instead of transmitting the full cost images of the travel paths, after step 724, the coordinates of the points along the segmented travel path for each robot could be transmitted to all other robots. From the travel path coordinates received from each robot, the receiving robots can execute steps 726-736 and locally generate and superimpose on its navigation map the cost images for each robots travel path.

As will be apparent, the superimposed cost image will comprise a gradient of numerical values/colors from highest to lowest (255-0) along the planned path of the robot. It should be noted that in step 722, when the current location of the robot is determined a circle having a radius of approximately 1 m would be created (see the circle about robot 700) with cost value equal to 255 (i.e. the equivalent of a fixed object) would be applied to the pixels in that circle. Thus, the gradient starts at a cost value of 255 (equivalent of a fixed object) and diminishes as the point is moved away from the robot along its planned travel path.

As indicated above, there is a significant amount of overlap with the circles formed along the path and each successive circle will contain pixels with a different numerical value. One way to address this issue, is that for each circle overlapping with a prior circle, the values of the pixels from the prior circle may be overwritten with the values determined for the new overlapping circle.

Having described the invention, and a preferred embodiment thereof, what is claimed as new and secured by Letters Patent is:

1. A method for generating a navigation map of an environment in which a plurality of robots will navigate, the method comprising:
   Obtaining an image of the environment, the image defined by a plurality of pixels, each pixel having a cost value associated with it; wherein the image of the environment includes an image of at least one fixed object comprising a set of pixels corresponding to the location of the at least one fixed object in the environment, the set of pixels corresponding to the location of the at least one fixed object having a first defined cost value; and
   Obtaining a planned path image for each of the plurality of robots in the environment, the planned path image including for each robot a first set of pixels corresponding to the location of each robot in the environment and a second set of pixels adjacent to the first set of pixels and extending along a planned path of travel of each robot toward a destination; the pixels in the first set of pixels of each robot having the first defined cost value and the second set of pixels of each robot comprising pixels having cost values which are less than the first defined cost value;
   wherein the image of the environment including the image of at least one fixed object is stored locally with each of the plurality of robots;
   wherein each of the plurality of robots produces its own planned path and communicates its own planned path to the other of the plurality of robots;
   wherein each robot combines the image of the environment including the image of at least one fixed object with images representing the planned paths received from other of the plurality of robots to form a navigation map; and
   wherein each robot uses the navigation map to plan a path from its current location to its destination.

2. The method of claim 1, wherein each of the plurality of robots produces its own updated planned path at regular time intervals as each robot traverses its path to its destination and communicates its own updated planned path to the other of the plurality of robots at such regular intervals; and wherein each robot uses the updated planned path of the other of the plurality of robots to produce an updated navigation map and updates its planned path to its destination using the updated navigation map.

3. The method of claim 1 wherein the second set of pixels of each robot comprises pixels having plurality of cost values less than the first cost value, and wherein the cost values of the pixels decrease proportionally in value as they extend from adjacent to the first set of pixels out along the planned path of travel of each robot toward a destination.

4. The method of claim 3 wherein the second set of pixels of each robot is formed by producing a plurality of regions along the planned path of travel of each robot toward a destination and wherein each region successively comprises pixels having cost values less than the preceding region.

5. The method of claim 4 wherein the plurality of regions are circular in shape and the regions have a radius corresponding to the size of at least one of the robots.

6. The method of claim 1 wherein the environment is a warehouse.

7. A method for navigating a robot in an environment from a current location to a destination, the environment including at least one fixed object and at least one other robot, the method comprising:
   Obtaining an image of the environment, the image defined by a plurality of pixels, each pixel having a cost value associated with it; wherein the image of the environment includes an image of the at least one fixed object comprising a set of pixels corresponding to the location of the at least one fixed object in the environment, the set of pixels corresponding to the location of the at least one fixed object having a first defined cost value;
   Obtaining an image of the at least one other robot in the environment, the image of the at least one other robot including a first set of pixels corresponding to the location of the at least one other robot in the environment and a second set of pixels adjacent to the first set of pixels and extending along a planned path of travel of the at least one other robot toward a destination; the pixels in the first set of pixels of the at least one other robot having the first defined cost value and the second set of pixels of the at least one other robot comprising pixels having cost values which are less than the first defined cost value; and Planning a path from the current location of the robot to the destination of the robot based on the image of the at least one fixed object and the image of the at least one other robot.

8. The method of claim 7, wherein the image of the environment including the image of at least one fixed object is stored locally within the robot.

9. The method of claim 8, wherein the at least one other robot produces its own planned path from a current location to a destination and communicates its own planned path to the robot.

10. The method of claim 9, wherein the robot combines the image of the environment including the image of at least one fixed object with an image of the planned path received from the at least one other robot to form a navigation map.

11. The method of claim 10, wherein the robot uses the navigation map to plan a path from its current location to its destination.

12. The method of claim 11, wherein the at least one other robot produces its own updated planned path at regular time intervals as it traverses its path to its destination and communicates its own updated planned path to the robot at such regular intervals; and wherein the robot uses the updated planned path of the at least one other robot to produce an updated navigation map and updates its planned path to its destination using the updated navigation map.

13. The method of claim 7, wherein the second set of pixels of the at least one other robot comprises pixels having plurality of cost values less than the first cost value, and wherein the cost values of the pixels decrease proportionally in value as they extend from adjacent to the first set of pixels out along the planned path of travel of the at least one other robot toward its destination.

14. The method of claim 13, wherein the second set of pixels of the at least one other robot is formed by producing a plurality of regions along the planned path of travel of the at least one other robot toward its destination and wherein each region successively comprises pixels having cost values less than the preceding region.

15. The method of claim 14, wherein the plurality of regions are circular in shape and the plurality of regions have a radius corresponding to the size of the robot or the at least one other robot.

16. The method of claim 7, wherein the environment is a warehouse.

17. A robot configured to navigate an environment, the environment including at least one fixed object and a plurality of other robots, the robot comprising:

A mobile base for propelling the robot throughout the environment;

A communication device enabling communication between the robot and the plurality of other robots; and A processor, in communication with the communication device, configured to:

Obtain an image of the environment, the image defined by a plurality of pixels, each pixel having a cost value associated with it; wherein the image of the environment includes an image of the at least one fixed object comprising a set of pixels corresponding to the location of the at least one fixed object in the environment, the set of pixels corresponding to the location of the at least one fixed object having a first defined cost value;

Obtaining an image of the plurality of other robots in the environment, the image including for each robot a first set of pixels corresponding to the location of each robot in the environment and a second set of pixels adjacent to the first set of pixels and extending along a planned path of travel of each other robot toward a destination; the pixels in the first set of pixels of each other robot having the first defined cost value and the second set of pixels of each other robot comprising pixels having a cost values which are less than the first defined cost value, and Planning a path from the current location of the robot to the destination of the robot based on the image of the at least one fixed object and the images of the plurality of other robots.

18. The robot of claim 17, wherein the image of the environment including the image of at least one fixed object is stored locally with each of the plurality of robots.

19. The robot of claim 18, wherein each of the plurality of other robots is configured to produce its own planned path and communicate its own planned path using its communications device to the robot and to the plurality of other robots.

20. The robot of claim 19, wherein the processor is configured to combine the image of the environment including the image of at least one fixed object with images of the planned paths received from the other of the plurality of robots to form a navigation map.

21. The robot of claim 20, wherein the processor is configured to use the navigation map to plan a path from its current location to its destination.

22. The robot of claim 21, wherein the processor is configured to receive from each of the plurality of other robots an updated planned path at regular time intervals as each other robot traverses its path to its destination; and wherein the processor is configured to use the updated planned path of the other of the plurality of robots to produce an updated navigation map and update its planned path to its destination using the updated navigation map.

23. The robot of claim 17 wherein the second set of pixels of each of the plurality of other robots comprises pixels having a plurality of cost values less than the first cost value, and wherein the cost values of the pixels decrease proportionally in value as they extend from adjacent to the first set of pixels out along the planned path of travel of each robot toward a destination.

24. The robot of claim 23 wherein the second set of pixels of each of the plurality of other robots is formed by producing a plurality of regions along the planned path of travel of each robot toward a destination and wherein each region successively comprises pixels having cost values less than the preceding region.

25. The robot of claim 24 wherein the regions are circular in shape and the regions have a radius corresponding to the size of at least one of the plurality of other robots.

26. The robot of claim 17 wherein the environment is a warehouse.

* * * * *